Dec. 11, 1934.   C. SCHUCK, JR., ET AL   1,983,710
AUTOMATIC OPERATION OF FUEL BURNERS
Filed Feb. 18, 1932   3 Sheets-Sheet 1
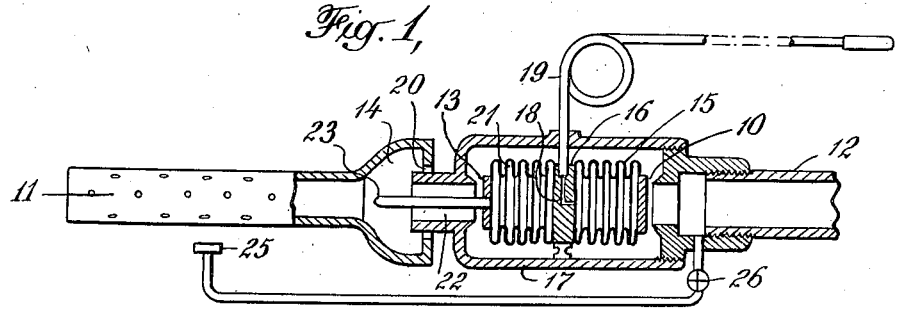
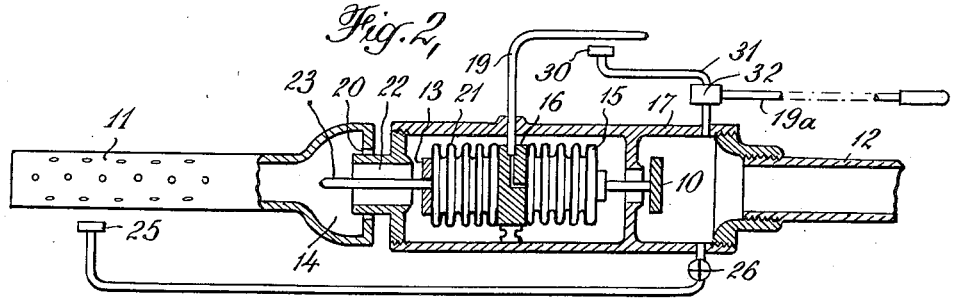
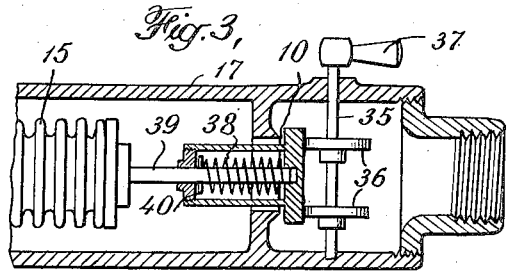
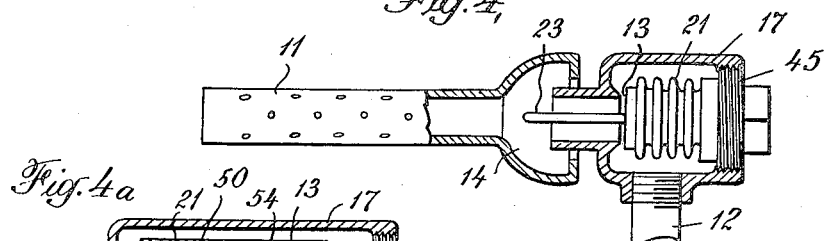
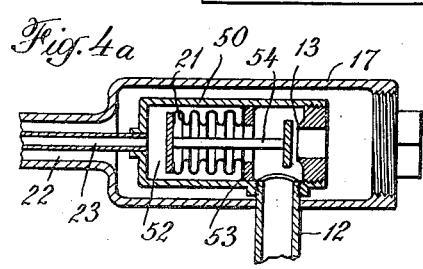
INVENTORS
George Layer and
Conrad Schuck, Jr.
BY
Pennie, Davis, Marvin & Edmonds
ATTORNEYS

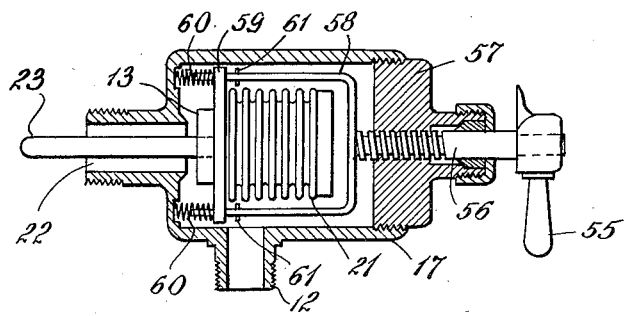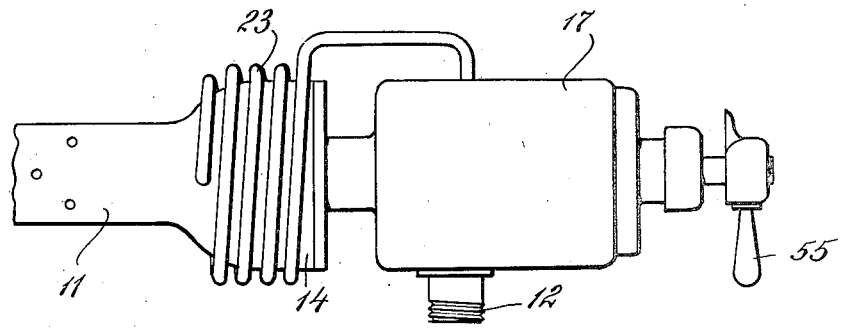

Dec. 11, 1934.   C. SCHUCK, JR., ET AL   1,983,710
AUTOMATIC OPERATION OF FUEL BURNERS
Filed Feb. 18, 1932   3 Sheets-Sheet 3
Fig. 7,
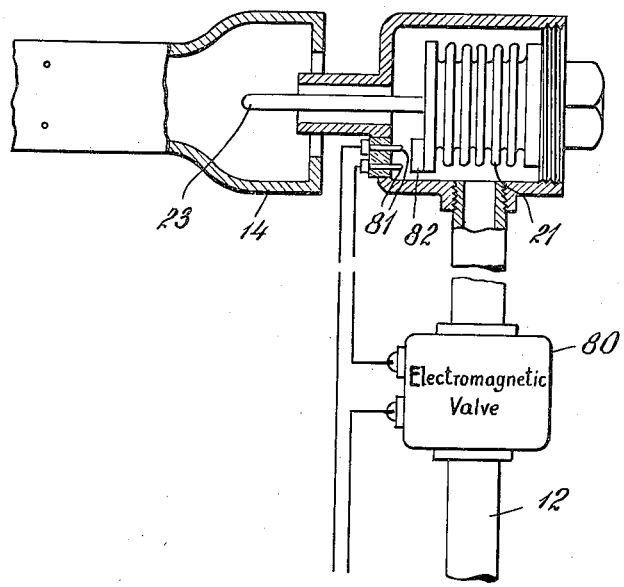
Fig. 8,
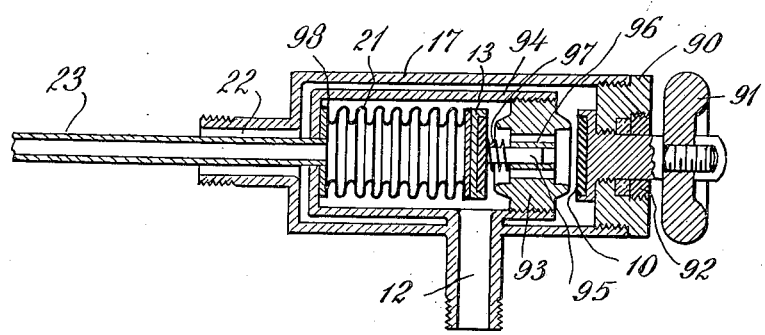
INVENTORS
George Layer and
Conrad Schuck, Jr.
BY
ATTORNEYS

UNITED STATES PATENT OFFICE 1,983,710

AUTOMATIC OPERATION OF FUEL BURNERS

Conrad Schuck, Jr., and George Layer, East Orange, N. J.

Application February 18, 1932, Serial No. 593,886

7 Claims. (Cl. 67—113)

This invention relates to the automatic operation of fuel burners and particularly to a novel method and means for regulating the supply of fuel to a burner so as to maintain the temperature of the place to be heated within close limits and for safeguarding the system against faulty operation.

Commonly, in fuel burner apparatus, fuel is supplied to a mixing chamber where it is mixed with air or other combustion supporting gas and the combustible mixture there created is delivered to a burner where the combustion takes place. The amount of heat generated is customarily controlled by a valve in the fuel supply line.

This control valve occasionally causes ignition difficulty due to flashbacks. These flashbacks occur when an improper mixture of fuel and air is formed with the result that the fuel in the mixing chamber is ignited and combustion proceeds there instead of at the burner. When the valve is automatically operated, as by a thermostat, there is no provision for stopping the flow of fuel when a flashback causes combustion thus to occur in the mixing chamber, because the response of the thermostat to this condition, involving no heating from the burner, is to open the fuel line rather than to close it.

For this reason automatically controlled fuel burners have previously been constructed so that the automatic control did not vary the valve opening by small increments but either opened the valve fully or closed it tightly. Theoretically, a regulation might be obtained by thus moving the valve between extreme positions at a rapid rate, varying as the need required, but such frequent starting and stopping of the burner is not desirable as a practical matter so the ordinary procedure has involved a relatively infrequent action of the valve, giving a rough regulation incapable of holding the temperature of the place to be heated within the narrow range that is desirable. Such action of the valve has lessened the flashback trouble, but not to a wholly satisfactory extent. The system of the present invention is devised to overcome these difficulties.

The present invention provides a system wherein the main fuel valve is automatically regulated by a thermostat or other automatic means, located at the place to be heated, which regulates finely and in proportion to the immediate need the degree to which the valve is opened so that the valve opens only to the extent necessary to produce the desired amount of heat, and wherein flashbacks are corrected by a device which automatically extinguishes the flame in the mixing chamber should a flashback occur, but allows the burner to resume operation as soon as the flashback is extinguished and the mixing chamber is sufficiently cooled to insure that the flashback will not recur at once.

The flashback corrector includes a valve which is automatically actuated to shut off the flow of fuel until the mixing chamber is cool enough so that it will not ignite the mixture but will let it pass to the burner. This flashback corrector valve is operated by a heat responsive device which is located so as to be heated by the heat of a flashback in the mixing chamber and is arranged so that when heated it closes the corrector valve. The valve opens again after the flashback is extinguished and preferably the reopening is made to depend on the cooling of the heat responsive element as the temperature of the mixing chamber decreases.

The thermostat for the flashback corrector may be made sufficiently sensitive so that it will open rapidly enough to obviate flashbacks due to slow action of the flashback corrector valve itself. However, if desired, means may be provided to give the flashback corrector valve a snap action so that it will open suddenly and thus prevent the possibility of its causing another flashback. A quick closing is desirable as well to give a prompt extinction of combustion in the mixing chamber.

Although any of the usual thermostatic control devices may be used to operate the main fuel valve and the flashback corrector valve, it is preferred to use a bellows, containing a fluid such as alcohol that vaporizes readily on heating, as the device to operate each of the valves. Each bellows is preferably located so as to be removed from the zone of heat to which it is to respond, and the bellows either contains, or is within, a body of fluid a part of which is in a tube extending to the zone of heat. Thus the fluid in the tube is heated to varying degrees as the temperature of the region to be regulated varies. The consequent expansion and contraction of the fluid produces a varying pressure on the bellows, resulting in movement of the bellows and of the valve connected to the bellows. We prefer a bellows of metal that is resilient so that upon decrease of pressure, incident to cooling of the fluid, the bellows may contract or expand, as the case may be, to reopen the valve without requiring additional springs. With this construction, the operation may be made more sensitive and the sensitivity may be varied by varying the length of the tube and the material of the tube and of the bellows as well as by varying the character of the fluid and the volume of the bellows. For instance, if the end of the tube exposed to the heat is small and especially if the tube contains a liquid that is vaporized easily, the part of this liquid at the end of the tube will quickly create a pressure sufficient to move the valve whenever the end of the tube is abnormally heated. The tubular member for the main fuel control valve may extend to the place to be heated or to a zone heated by a supplemental burner whose heating effect is controlled by the temperature of the place to be heated. The tube for the flashback corrector valve preferably extends into the mixing chamber, or to its near vicinity, where it will be heated by the heat of the flashback, should one occur. There is considerable latitude in the shape and arrangement of the element referred to here as the tube.

Other ignition difficulties resulting in faulty operation in addition to the ignition difficulty caused by the ignition of fuel in the mixing chamber are corrected by the flashback corrector forming part of our invention. For example, if an improper mixture of air and fuel causes the fuel to burn with a yellow flame at the burner instead of the proper blue flame, the burner and mixing chamber would become sufficiently heated to operate the flashback corrector valve and thus shut off the supply of fuel. If the supply of fuel were not shut off, an excessive amount of fuel would be consumed in securing the requisite amount of heat, and there would be an undesirable carbon deposit from the yellow flame. The flashback corrector safeguards against this faulty operation by cutting off the flow of fuel so as to extinguish the flame which has been improperly ignited and then restoring the flow of fuel to secure proper ignition. Another benefit is to be derived from the use of our flashback corrector is the prevention of unburned fuel due to a smothering of the flame at the burner. For example, if the flue is stopped up so as not to allow the products of combustion to escape quickly enough, the flame at the burner will eventually smother and unburned fuel will escape. Before the flame smothers, however, sufficient heat will have been generated and confined to cause the flashback corrector to operate and shut off the supply of fuel.

Various modifications and refinements may be made of the system as described; and parts of the system, such as the flashback corrector, may be used without the other parts of the system.

Several preferred embodiments of our invention are illustrated in the annexed drawings and are more particularly described hereinafter. In the several views, identical or corresponding parts are identified by the same reference number.

In the drawings:

Fig. 1 is a diagrammatic view of the preferred form of the system in its simplest arrangement, with the valve structure shown in section;

Fig. 2 is a diagrammatic view of the system modified so that the main fuel valve is controlled by a relay action through a supplemental burner which increases its sensitivity, the valve structure being shown in section;

Fig. 3 is a sectional view of the main fuel valve showing a manual control combined with the automatic control;

Fig. 4 is a sectional view of the flashback corrector adapted for use alone;

Fig. 4a is a similar view of corrector valve with the bellows contained within the body of operating fluid, so as to be compressed rather than expanded by expansion of the fluid;

Fig. 5 is a sectional view of the flashback corrector adapted for use in combination with a manual control;

Fig. 6 is a modification of the device shown in Fig. 5; in this modification the heat sensitive element which operates the flashback valve is located on the outside of the mixing chamber;

Fig. 7 is a sectional view showing the flashback corrector which closes and opens the circuit of an electromagnetic valve;

Fig. 8 is a sectional view of a flashback corrector embodying the principles of the flashback corrector shown in Figs. 4 and 5 but in a form particularly adapted for commercial use.

In the system of this invention as illustrated in Fig. 1, a regulating valve 10 regulates the amount of fuel supplied to the burner 11 from the fuel feed line 12 and a flashback corrector valve 13 temporarily shuts off the supply of fuel to the mixing chamber 14 of the burner whenever a flashback occurs, but allows the burner to resume its normal operation as soon as the flashback is extinguished.

The closure member of the regulating valve 10 is directly attached to one end of a bellows 15 of the kind referred to above; the other end of this bellows is attached to a block 16 secured in a casing 17. A passage 18 in the block 16 communicates with the interior of the bellows 15 and with the outside of the block, and a tube 19, connected to this passage, extends through the casing 17 and to the region heated, directly or indirectly, by the burner 11. This tube and the bellows 15 are filled with a fluid which exerts varying pressure at the bellows in accordance with variations of temperature at the end of the tube. This varying pressure results in a variation of the opening between the valve closure and its seat, thus varying the amount of fuel passing from the supply line 12 to the burner 11 by way of the casing 17 and the mixing chamber 14. Air is admitted to the mixing chamber 14 through the openings 20 in the chamber casing.

The flashback corrector consists of a valve 13, the closure member of which is directly attached to a bellows 21 which is secured to the same block 16. The seat for the valve 13 is formed by a part of the casing 17 at the passage 22 connecting this casing with the mixing chamber. A tube 23 mounted on the bellows or valve closure in any suitable way is open at one end to the interior of the bellows 21. Fluid fills the bellows and this tube 23 and the part of the fluid at the outer end of this tube is thus exposed to the heat generated in the mixing chamber when a flashback occurs. With a properly chosen fluid and a suitably small tube 23, such sensitivity may be obtained that a flashback will cause a prompt increase of pressure within the bellows sufficient to expand the bellows and close the valve 13 almost immediately after the flashback occurs, thus extinguishing the flashback. As soon as the temperature in the mixing chamber decreases, the fluid in the tube 23 and in the bellows 21 cools and contracts and releases the pressure on the valve, whereupon the bellows contracts due to its resiliency and thereby opens the valve to permit the resumption of fuel flow to the burner.

The fuel mixture delivered at the burner is ignited by a pilot 25 which burns continuously, being fed by fuel from the supply line 12, the connection to which is at a point back of the main valve 10. An adjusting valve 26 is preferably provided in the line leading to the pilot so that the amount of fuel passing to the pilot may be regulated at will. This pilot 25 ignites the fuel mixture as soon, after a flashback, as the corrector valve 13 reopens to permit the resumption of fuel delivery.

As a way of increasing the sensitivity of the operation of the main valve 10, the modified apparatus shown in Fig. 2 may be used. This involves the use of a control burner 30 continuously receiving fuel from the main supply through a connection 31 leading to the casing 17 at a point back of the main valve 10. The tube 19 in this case does not extend to the region whose temperature is to be regulated but extends instead only to the zone heated by the control burner 30. The regulation is obtained in this case by varying the supply of fuel to the control burner 30 and thereby varying the degree of heating the end of the tube 19 in proportion to changes in the temperature regulated, but with such step-up of the response to a given change in that temperature as may be desirable.

The regulation of the supply to the control burner is effected in a manner corresponding to that used in the apparatus of Fig. 1 for regulating the main supply of fuel. In the supply line 31 there is a valve 32 (the details of which are not shown) operated by a bellows containing a fluid extending also into a tube 19a which reaches to the region heated by the burner 11.

In this arrangement, as shown, the regulating valve 32 in the control burner supply line 31 is arranged to close upon an increase of pressure on its bellows resulting from an increase of temperature at the end of the tube 19a. The valve 32 does not close entirely, however, as the control burner 30 is never extinguished, but the range of its regulatory action on the supply of fuel to the control burner 30 is such that a variation of heating of the tube 19 may be obtained sufficient to operate the main regulating valve 10 over the full range desired. The effect of a closing of the valve 32, in response to an increased temperature in the heated region, is to decrease the heating at the control burner 30 with the result of decreasing the pressure in the tube 19 and in the bellows 15, whereupon the bellows contracts and moves the main regulating valve 10 toward its seat a proportionate amount. The valve 10 in this case is on the opposite side of its seat from that shown in Fig. 1. A valve such as shown in Fig. 1 may be used equally well, of course, if the control burner valve 32 is arranged to open, in order to increase the heating by a control burner 30, upon an increase of temperature at the end of the tube 19a in the heated region.

In other respects, the apparatus shown in Fig. 2 is the same as that of Fig. 1 and the operation of the flashback corrector is the same.

It is sometimes desirable to provide for manual control of the fuel supplied to the burner, supplementing the automatic control. This may be done, without providing an additional valve, by the arrangement shown in Fig. 3. There, the main valve 10 of an apparatus such as that shown in Fig. 2 is represented with a hand-operated closing means consisting of a spindle 35 mounted in the casing 17 with two cams 36 secured to it within the casing and a handle 37 secured to it outside of the casing. The cams bear on the valve closure so that upon turning the handle 37 the cams 36 move the closure toward its seat or permit it to move away from its seat under the influence of a coil spring 38 surrounding the valve stem 39 between a pin 40, fixed to the valve stem, and the valve closure which thus is free to move inwardly along the valve stem from its outer position determined by the pin 40. Thus the closure may be seated by manual operation, or its open position may be set, without affecting the bellows and when the bellows contracts it can move the valve closure without interference from the hand control mechanism. The spring also permits the valve stem to move after the closure has reached its limit, determined by the cams. This avoids unnecessary strain on the parts.

The flashback corrector shown in Figs. 1 and 2 may be used separately as well as in conjunction with an automatically or manually controlled main valve in the fuel supply line. An apparatus representing such a separate use of the flashback corrector is shown in Fig. 4. In this case the bellows 21 is secured to a threaded head 45 which is screwed into the casing 17. The operation is the same as that described above for the flashback corrector shown in Figs. 1 and 2.

An apparatus in which the bellows is surrounded by the actuating fluid, instead of containing the fluid as in the embodiments already described, is shown in Fig. 4a. This form of valve actuator may be used either separately or with a main supply valve. Here the casing 17 has within it a smaller casing 50 with which the main fuel supply line 12 communicates without communicating directly with the interior of the casing 17. A passageway 22 leads from the larger casing 17 to the mixing chamber (not shown). A tube 23, as in the other forms of the apparatus, extends through this passageway into the mixing chamber but, here, instead of leading to the interior of the bellows, this tube opens into a chamber 52 formed in the inner casing 50 by a partition 53 to which the bellows 21 is secured so as to expose its outer surface to the fluid contained in this chamber and in the tube 23. The corrector valve 13 controls the flow of fuel from the inner casing 50 to the outer casing 17, and hence controls the flow of fuel from the main supply 12 to the mixing chamber. The closure member of this valve is mounted on a spindle 54 which is suitably secured to the bellows so as to move with the end closure of the bellows. The bellows, as in the other forms, is so constructed that when normal temperature conditions prevail in the mixing chamber the fluid contained in the tube 23 and in the chamber 52 permits the bellows to expand so as to hold the valve 13 away from its seat. When a flashback occurs, the fluid at the end of the tube 23 is heated, and, if conditions are properly determined, may even vaporize, but in any event the pressure increases and the bellows is compressed, thereby moving the valve closure to its seat to stop the flow of fuel. As the mixing chamber cools, the fluid in the tube 23 contracts and decreases the pressure on the bellows so as to permit the latter to expand and move the valve away from its seat, thus restoring the flow of fuel. The character of the fluid, the size of the tube, and the design of the bellows are so chosen and related, as in the case of the other form, that this action of closing the valve takes place only under temperature conditions which are so abnormal as to call for a stoppage of the flow of fuel, and the opening of the valve takes place only when the mixing chamber is at such a temperature as to make it suitable for the flow of fuel to be resumed.

The flashback corrector valve may be provided with a manual operating means supplementing the automatic actuator, but independent of it so that neither one interferes with the action of the other. In Fig. 5 is shown a flashback corrector valve 13, somewhat of the form illustrated in Fig. 4, having a tube 23 and a bellows 21 filled with an expansible fluid for expanding the bellows to close the valve when a flashback occurs. The bellows is mounted within the casing 17 to which the main fuel line 12 leads and which has a passageway 22 leading to the mixing chamber. The seat for the corrector valve is at the entrance to this passageway. The automatic operation is the same as has been described. The manual operation of the valve is effected by a handle 55 attached to the outer end of a threaded spindle 56, which turns in a head 57 screwed into the casing 17. Suitable packing is provided around the spindle 56 to prevent leakage. The inner end of the spindle is attached to a yoke 58 which straddles the bellows and the extending arms of which pass through, but are not secured to, a plate 59 suitably attached to the valve closure, which is free to slide along the tube 23. Coil springs 60, around the ends of these arms and between the end wall of casing 17 and the plate 59, tend to hold the plate against the bellows, but when the handle 55 is turned to advance the yoke 58, small pins 61 on the arms of the yoke engage the plate 59 and move it and the valve closure away from the bellows to seat the valve. The valve is free to close under the influence of the bellows because the plate 59 can slide along the arms of the yoke without interference.

It is not necessary that the tube 23 containing the expansible fluid extend directly into the mixing chamber. As shown in Fig. 6, this tube may lead from the interior of the bellows (or from the chamber surrounding the bellows where that alternative construction is used) out through the casing 17 and may be located on the outside of the mixing chamber, an arrangement of the tube in a coil around the mixing chamber being shown. In this way, the tube and its contained fluid are subject to the heat generated in the mixing chamber when a flashback occurs and so the operation of the valve is responsive in the same way to this condition.

The arrangement as shown in Fig. 6, wherein the expansible fluid derives its heat from contact with the mixing chamber, is particularly effective in curing improper ignition conditions which result in combustion with a yellow flame instead of combustion with a blue flame and also in correcting difficulties due to choked up flues and the like. In both of these circumstances the metal of the burner and mixing chamber is quite likely to become heated more quickly than the gas within the mixing chamber and therefore the flashback corrector of Fig. 6 would be more quickly responsive than a flashback corrector such as is shown in Fig. 5, for example, where the expansible fluid derives most of its heat from the gas within the mixing chamber.

A modification is possible also in respect of the way in which the bellows operates the flashback corrector valve. The operation need not be direct as in the forms described above, where the valve is mounted directly on the bellows, for the two may be separated and an indirect connection may be provided. One instance of this is the apparatus shown in Fig. 7, wherein there is a valve 80 in the main supply line 12 arranged to be closed by an electromagnet the circuit of which contains two contacts 81 placed in the path of a contactor 82 mounted on the bellows 21, so that when the bellows expands under the influence of an increasing pressure in the fluid contained within it and within the tube 23, the contactor 82 will bridge the contacts 81 to close the circuit through the electromagnet. The valve may be biased toward open position by a spring, or may be otherwise arranged to re-open when the circuit is opened upon cooling of the mixing chamber and consequent retraction of the bellows 21 and the contactor 82.

In Fig. 8 is shown a commercial form of valve embodying a flashback corrector and a hand-operated valve for shutting off or for varying the amount of the flow of fuel from the supply 12 to the mixing chamber (not shown). The main casing 17 has a plug or head 90 threaded into it at one end. The hand-operated main valve 10 is at the end of a spindle threaded into this head 90. The hand wheel 91 is attached to the outer end of the spindle and suitable packing 92 is provided in the head 90 around the valve spindle to prevent leakage. The seat for the valve 10 is provided by a block 93 which is threaded into an inner casing 94 which is secured within the outer casing 17. This block 93 has openings through it by which the fuel, which is delivered from the main supply 12 directly to the inner casing, may pass to the outer casing 17 and thence by way of the passage 22 to the mixing chamber. Another valve seat is provided on the inner side of this block 93 for the flashback corrector valve 13 which is mounted on the free end of a bellows secured, at its other end, to the end wall of the inner casing 94. The tube 23 is secured to this same end wall, or to the end closure of the bellows, and opens to the interior of the bellows as in other forms described above. This tube extends into the mixing chamber so as to be subjected to the heat generated therein by a flashback. A stem 95 secured to the closure of the corrector valve 13 extends into a sleeve 96 which is a part of the block 93. This stem serves as a support for the valve. A coil spring 97 surrounding this stem may be provided to urge the valve 13 normally toward open position in order to make certain its re-opening as the pressure of the fluid within the bellows decreases and the bellows contracts. The operation is the same as that described above. The heat caused by a flashback creates an increased pressure in the fluid within the tube 23 and within the bellows 21 so that a pressure is exerted tending to expand the bellows and move the corrector valve 13 against its seat, thus shutting off the supply of fuel in order to extinguish the flashback. The supply of fuel may be shut off also by turning the hand wheel 91 to bring the main valve 10 to its seat. This main valve may be adjusted also to give any desired normal rate of flow to the burner.

Access may be had to the interior of this apparatus by removing the plug or head 90. If it is desired to get at the bellows within the inner casing 94, the block 93 may be removed easily after the head 90 has been taken out. If desired, the spring 97 may be relied upon to hold the bellows against the end wall of the inner casing 94, thus doing away with the need of any means for securing the bellows to the casing, and the tube 23 may be secured to the end plate 98 of the bellows so that when the block 93 is removed the bellows and the tube 23 may be withdrawn from the casing.

We claim:

1. A corrector for correcting improper ignition or combustion in a fuel burner comprising a valve which controls the supply of fuel to the burner and a thermal responsive means comprising an expansible fluid-filled bellows on which the valve closure is carried and which has a tubular extension extending through the valve opening into the mixing chamber of the fuel burner where it will be heated by the heat from improper ignition or combustion, said thermal responsive means operating to close the valve and stop the supply of fuel to the burner when so heated and to open the valve and allow the burner to be again supplied with fuel when the heat due to improper ignition or combustion has dissipated.

2. A corrector for correcting improper ignition or combustion in a fuel burner comprising a valve which controls the supply of fuel to the burner and a thermal responsive means comprising a fluid-filled bellows having a tubular extension which is coiled around the outside of the mixing chamber of the fuel burner where it will be heated by improper ignition or combustion, said thermal responsive means operating to close the valve and stop the supply of fuel to the burner when so heated and to open the valve and allow the burner to be again supplied with fuel when the heat due to improper ignition or combustion has dissipated.

3. A valve for controlling the operation of a fuel burner which comprises a valve casing through which fuel passes to the mixing chamber of the burner, a corrector valve in said casing comprising a fluid filled bellows supported at one end from said casing and carrying a valve closure at the other end cooperating with a valve seat formed in the casing to control the flow of fuel through said casing, and a fluid filled tube communicating with said bellows and extending through the valve closure and valve seat, out of the casing and into the mixing chamber, where it will be heated by the heat due to improper ignition or combustion, and the liquid therein will be expanded to close the valve until the heat due to improper ignition or combustion is dissipated.

4. A corrector for correcting improper ignition or combustion in a fuel burner comprising a valve casing, means for conveying fuel from said casing to the burner, a chamber within said casing, means to convey the fuel to the chamber, a valve controlling the passage of fuel from the chamber into said casing, a fluid operated bellows within the chamber operating said valve, and a fluid filled tube communicating with said bellows and extending to a place where it will be heated by heat due to improper ignition or combustion.

5. A corrector for correcting improper ignition or combustion in a fuel burner comprising a valve which controls the supply of fuel to the burner, a thermal responsive means comprising an expansible and contractible fluid operated bellows, an element carried by said bellows adapted in one position of the bellows to effect closing of said valve, a tubular member the interior of which is in communication with said bellows, a thermal expansible and contractible fluid in said member, said tubular member extending into a heat exchanging relationship with the mixing chamber where it will be heated by the heat from improper ignition or combustion, said thermal responsive means operating to close the valve and stop the supply of fuel to the burner when so heated and to open the valve and allow the burner to be again supplied with fuel when the heat due to improper ignition or combustion has dissipated.

6. A corrector for correcting improper ignition or combustion in a fuel burner having a mixing chamber, comprising a valve which controls the supply of fuel to the burner and thermal responsive means positioned outside of the mixing chamber and in heat conducting relationship therewith so as to be heated by improper ignition or combustion, said thermal responsive means operating to close the valve and stop the supply of fuel to the burner when so heated and to open the valve and allow the burner to be again supplied with fuel when the heat due to improper ignition or combustion has dissipated.

7. A corrector for correcting improper ignition or combustion in a fuel burner comprising a casing, means for conveying fuel from said casing to the burner, a chamber within said casing, means to convey the fuel to the chamber, a valve in said chamber controlling the passage of fuel from the chamber into said casing, and thermal responsive means for operating said valve, said thermal responsive means being positioned partly in said chamber and having a portion extending to a place where it will be heated by heat due to improper ignition or combustion.

CONRAD SCHUCK, Jr.
GEORGE LAYER.